United States Patent [19]

Zaun et al.

[11] 3,750,211

[45] Aug. 7, 1973

[54] BEET-CLEANING AND CONVEYING APPARATUS

[75] Inventors: Richard David Zaun; Howard Fred Clausen, both of Des Moines, Iowa

[73] Assignee: Deere & Company, Moline, Ill.

[22] Filed: Aug. 16, 1971

[21] Appl. No.: 172,126

[52] U.S. Cl............ 15/3.11, 15/3.2, 15/3.21, 29/121 H, 130/5 C, 171/133, 198/229, 209/263
[51] Int. Cl.. A23n 13/00, A23n 15/06, B65g 33/06
[58] Field of Search............ 15/3.11, 3.2, 3.21; 171/25, 133; 130/5 C; 209/107; 198/215, 229; 29/121 H

[56] References Cited
UNITED STATES PATENTS

| 3,267,502 | 8/1966 | Wells | 15/3.11 |
| 3,451,084 | 6/1949 | Silver | 15/3.11 |
| 3,217,346 | 11/1965 | Silver et al. | 15/3.11 |
| 1,335,522 | 3/1920 | Neal | 209/107 |
| 2,725,686 | 12/1955 | Ash | 15/3.2 X |
| 3,580,389 | 5/1971 | Nonnenmacher | 198/229 |

Primary Examiner—Daniel Blum
Attorney—H. Vincent Harsha, William A. Murray and R. L. Hollister et al.

[57] ABSTRACT

A plurality of rollers are mounted on a frame in parallel relation to form troughs therebetween and the adjacent rollers are driven in opposite directions. A helical flighting is mounted on each of the rollers for rotation thereon and is driven in the same direction as its associated roller but at a slightly less angular velocity. The rotating rollers provide a scrubbing action on beets deposited thereon to remove dirt and other foreign substances from the beets and the helical flightings move the beets axially of the rollers to deposit the beets over one end of the rollers. By having the helical flighting rotate at a slightly less angular velocity than their associated rollers, they provide a cleaning action on the rollers to prevent any mud buildup on the rollers.

12 Claims, 5 Drawing Figures

PATENTED AUG 7 1973 3,750,211
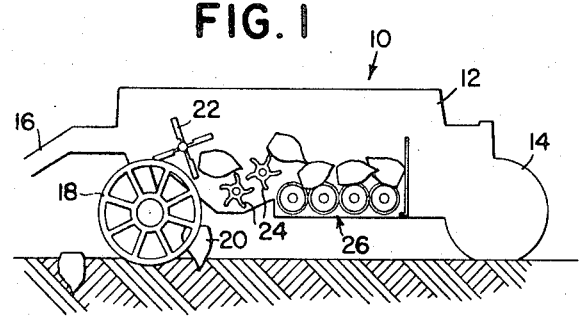
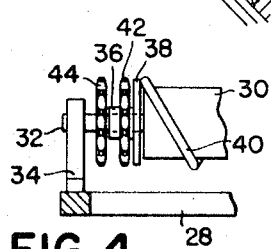
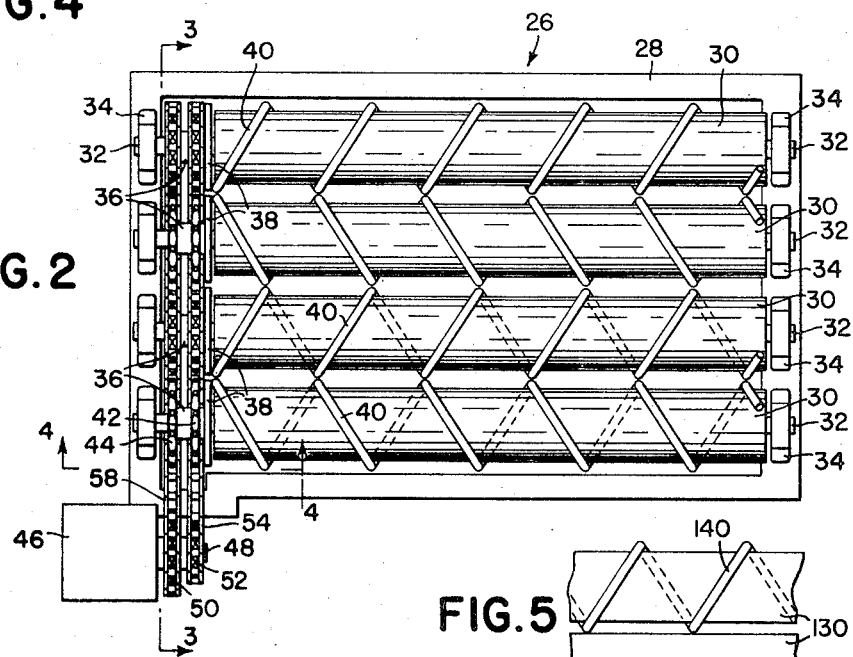
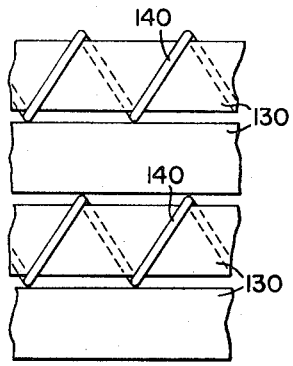
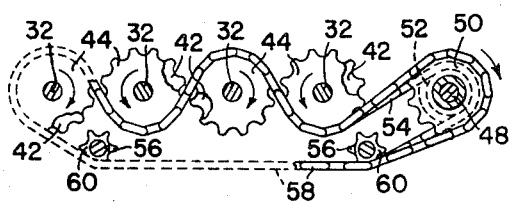
INVENTORS
RICHARD D. ZAUN
HOWARD F. CLAUSEN
BY
R L Hollister
ATTORNEY

3,750,211

BEET-CLEANING AND CONVEYING APPARATUS

BACKGROUND OF THE INVENTION

The present invention relates generally to apparatus for cleaning root crops such as sugar beets and more particularly relates to a self-cleansing beet cleaner and conveyor.

When root crops such as sugar beets are harvested, a large quantity of dirt clings to the surface of the beets and materially increases the weight and displacement of the beets. To remove the dirt and other foreign materials, it has been customary to pass the beets over roll-type cleaners which employ a series of parallel rollers or grab rolls which tumble the beets and provide a scrubbing action thereon and which are spaced sufficiently far apart to permit passage of loosened soil, small rocks, and other foreign material. Many of the roll-type cleaning mechanisms have helical flights mounted on and fixed to the rollers which serve to convey the beets along the grab rolls and deposit the same over one end of the grab rolls.

Roll-type cleaning mechanisms have been successful in removing both dry and wet dirt and other foreign material. However, a definite problem with this type mechanism has been mud buildup on the rolls between the helical flighting. The mud would pack on the rollers between the helical flighting with the result that the beets would not be conveyed over one end of the grab rolls. This mud buildup also would cause the grab rolls to be much too aggressive and do considerable damage by crushing beets through the rolls.

SUMMARY OF THE INVENTION

The principal object of the present invention is to provide a self-cleansing roll-type beet cleaner.

A more specific object of the present invention is to provide a roll-type beet cleaner in which the grab rolls are provided with helical flights which are driven at a slight speed differential with respect to their associated rolls to provide a scrubbing action on the rolls and remove any mud which may adhere to the rolls.

The above objects and additional objects and advantages will become apparent to those skilled in the art from a reading of the following descriptions of preferred embodiments when taken in conjunction with the accompanying drawing.

BRIEF DESCRIPTION OF THE DRAWING

FIG. 1 is a schematic view of a beet harvester embodying the cleaning and conveying mechanism according to the present invention;

FIG. 2 is a top plan view of the beet-cleaning and conveying mechanism according to the present invention;

FIG. 3 is a view taken substantially along the line 3—3 of FIG. 2;

FIG. 4 is a view taken substantially along the line 4—4 of FIG. 2; and,

FIG. 5 is a top plan view of a portion of an alternate form of beet-cleaning and conveying mechanism according to the present invention.

DESCRIPTION OF THE PREFERRED EMBODIMENTS

Referring now to the drawings, a beet harvester embodying the cleaning mechanism according to the present invention is indicated generally at 10 and includes a main frame 12 supported at the rear by wheels 14 and at its forward end by a forwardly extending hitch member 16. Conventional digger wheels 18 at the forward end of the harvester dig beets 20 and raise the same to a position where they are contacted by the paddle wheels 22 which throw the beets rearwardly onto a bed of star wheels 24 which remove some of the soil clinging to the beets and convey the beets rearwardly onto the cleaning bed indicated generally at 26. The cleaning bed 26 moves the beets laterally to an elevator (undisclosed) for advancement to a point of collection.

The preferred embodiment of the invention is illustrated in FIGS. 2-4 and includes a rectangular frame 28 which may be part of the main frame 12 of the harvester 10 or may be a separate frame adapted to be mounted on the main frame 12 of the harvester 10. A plurality of rollers or grab rolls 30 are provided with shafts 32 at their opposite ends which are journaled in bearing blocks 34 secured to the sides of the frame 28. The grab rolls 30 are positioned closely adjacent and parallel to each other to form troughs for receiving the beets. A sleeve 36 is rotatably mounted on each of the shafts 32 on the left-hand end of the rollers 30 as viewed in FIG. 2 and has a flange 38 secured to the end thereof adjacent its respective roller. Each of the flanges 38 has a diameter slightly greater than the grab rolls. A helical flight 40 loosely encircles each of the rollers 30 for rotation thereon, and each of the helical flights is substantially coextensive with its associated roller. The left-hand end of each of the helical flights is secured as by welding or the like to its respective flange 38. For reasons to be explained hereinafter, adjacent helical flights are oppositely pitched as is illustrated in FIG. 2.

For the purpose of driving the helical flights 40, a toothed wheel 42 is non-rotatably mounted on each of the sleeves 36, and for the purpose of driving the grab rolls 30, a toothed wheel 44 is non-rotatably mounted on each of the shafts 32 adjacent the sleeves 36. The toothed wheels 42 and 44 have the same diameter and number of teeth. A drive means for the grab rolls and helical flights is indicated schematically at 46 and can be any form of drive means such as a gear box or hydraulic motor. A shaft 48 projects from one end of the drive means 46 and has a pair of toothed wheels 50 and 52 non-rotatably mounted thereon. The toothed wheel 50 is larger than the toothed wheel 52 so that it will have a higher peripheral velocity than the toothed wheel 52.

A first endless chain is trained about the toothed wheels 52 and 42 to couple the helical flights 40 with the drive means 46. The top flight of the endless chain 54 alternately engages the top and bottom portions of the toothed wheels 42 to drive adjacent helical flights 40 in opposite directions as indicated by the arrows in FIG. 3. A pair of idler wheels 56 engage the bottom flight of the endless chain 54 to maintain the proper tension thereof. A second endless chain 58 is trained about the toothed wheels 50 and 44 to couple the grab rolls 30 with the drive means 46. The upper flight of the endless chain 58 alternately engages the top and bottom portions of the toothed wheel 44 so as to drive adjacent grab rolls 30 in opposite directions as indicated by the arrows in FIG. 3.

When beets are deposited on the cleaning mechanism 26, they fall within the troughs formed by the grab rolls 30 and the grab rolls 30 provide a scrubbing action on the beets to remove dirt and other foreign material which falls downwardly through the spaces between the grab rolls. The helical flights 40 engage the beets and move the same axially along the rollers 30 toward the right-hand ends thereof as viewed in FIG. 2. The opposite pitch on adjacent helical flights is required to move the beets in the proper direction due to the opposite direction of rotation of adjacent helical flights. The movement of the beets axially of the grab rolls provides additional scrubbing action and hence additional cleaning of the beets.

Because of the different sizes of the toothed wheels 50 and 52, the helical flights are driven at a slightly lower angular velocity than are the grab rolls 30 and provide a scrubbing action on the grab rolls 30 to remove any mud which may have adhered to the grab rolls. This cleansing action of the helical flights on the grab rolls 30 ensures proper scrubbing of the beets and also prevents dirt from building up on the rolls to the point where the helical flights are no longer effective for conveying the beets.

A slightly modified form of the invention is illustrated in FIG. 5. In this form of the invention, helical flighting 140 is only mounted on alternate grab rolls 130. However, due to the speed differential between the helical flighting and grab rolls, each helical flight will provide a cleansing action on its associated grab roll and also on the next adjacent grab roll.

From the foregoing, it can be seen that the present invention provides a roll-type cleaning mechanism which will clean and convey beets and also provide a cleansing action for itself so that it remains effective when working in muddy conditions.

Although two preferred embodiments of the invention have been described and illustrated, various modifications within the spirit and scope of the invention will become apparent to those skilled in the art and can be made without departing from the underlying principles of the invention. Therefore, the invention should not be limited by the specific illustration and description, but only by the following claims.

I claim:

1. A root crop cleaning mechanism comprising: a frame; a plurality of elongated rollers rotatably mounted on the frame in parallel relation and positioned sufficiently close to each other to prevent roots deposited thereon from passing therebetween; means for driving the rollers to provide a scrubbing action on roots deposited thereon to remove foreign material clinging thereto; helical flight means loosely encircling at least alternate ones of the rollers for rotation thereabout; and means for driving the helical flight means at a different angular velocity than the rollers so that the helical flight means will move roots axially along the rollers to deposit the roots over one end of the rollers and the helical flight means will move relative to the rollers to provide a cleaning action on the rollers which prevents a buildup of foreign material on the rollers.

2. The cleaning mechanism set forth in claim 1 wherein the helical flight means are driven in the same direction as their associated rollers.

3. The cleaning mechanism set forth in claim 2 wherein adjacent rollers are driven in opposite directions.

4. The cleaning mechanism set forth in claim 3 wherein there is a helical flight means for each roller.

5. The cleaning mechanism set forth in claim 4 wherein the helical flights on adjacent rollers are oppositely pitched.

6. A root crop cleaning mechanism comprising: a frame; a plurality of elongated rollers rotatably mounted on the frame in generally parallel relation and spaced from each other a distance sufficiently small to prevent roots deposited thereon from passing therebetween; means for driving the rollers to provide a scrubbing action on roots deposited thereon to remove foreign material clinging thereto; helical flight means loosely encircling each of the rollers for rotation thereon; and means for driving the helical flight means at a different angular velocity than the rollers so that the helical flight means will move roots axially along the rollers to deposit the roots over one end of the rollers and the helical flight means will move relative to the rollers to provide a cleaning action on the rollers which prevents a buildup of foreign material on the rollers.

7. The cleaning mechanism set forth in claim 6 wherein each of the helical flight means is driven in the same direction as its associated roller.

8. The cleaning mechanism set forth in claim 7 wherein adjacent rollers are driven in opposite directions and the helical flight means on adjacent rollers are oppositely pitched.

9. The cleaning mechanism set forth in claim 8 wherein the helical flight means are driven at an angular velocity less than the angular velocity of their associated rollers.

10. A root crop cleaning mechanism comprising: a frame; a plurality of equally spaced closely adjacent rollers mounted on the frame in coplanar and parallel relation; drive means; means coupling the drive means with the rollers to rotate the rollers and provide a scrubbing action on roots deposited thereon to remove foreign material clinging thereto; helical flight means loosely encircling at least alternate ones of the rollers for rotation thereon; and means coupling the drive means with the helical flight means to rotate the helical flight means at a different angular velocity than the rollers so that the helical flight means will move roots axially along the rollers to deposit the roots over one end of the rollers and the helical flight means will move relative to the rollers to provide a cleaning action on the rollers which prevents a buildup of foreign materail on the rollers.

11. The cleaning mechanism set forth in claim 10 wherein there is a helical flight means loosely encircling each roller and the coupling means drives the helical flight means in the same direction as the rollers and at an angular velocity less than the angular velocity of the rollers.

12. The cleaning mechanism set forth in claim 11 wherein the coupling means interconnects the drive means with the rollers to drive adjacent rollers in opposite directions.

* * * * *